(12) United States Patent
Cranford, Jr. et al.

(10) Patent No.: US 7,684,517 B2
(45) Date of Patent: *Mar. 23, 2010

(54) REDUCING POWER CONSUMPTION IN SIGNAL DETECTION

(75) Inventors: Hayden Clavie Cranford, Jr., Cary, NC (US); Westerfield John Ficken, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/045,343

(22) Filed: Mar. 10, 2008

(65) Prior Publication Data

US 2008/0165897 A1 Jul. 10, 2008

Related U.S. Application Data

(63) Continuation of application No. 10/873,672, filed on Jun. 22, 2004, now Pat. No. 7,406,135.

(51) Int. Cl.
*H04L 27/00* (2006.01)

(52) U.S. Cl. .......................... 375/316; 375/340; 327/37

(58) Field of Classification Search ................ 375/224, 375/225, 226, 227, 228, 286, 287, 340, 316; 327/77, 37, 74; 455/343.2; 714/721; 702/193
See application file for complete search history.

(56) References Cited

U.S. PATENT DOCUMENTS

| | | | |
|---|---|---|---|
| 4,475,210 A * | 10/1984 | Couch | 375/224 |
| 4,545,244 A | 10/1985 | Yasuda | |
| 4,712,056 A | 12/1987 | Schott | |
| 4,878,726 A | 11/1989 | Fatehi | |
| 5,066,924 A | 11/1991 | Wendt | |
| 5,418,409 A * | 5/1995 | Kuhn | 327/78 |
| 5,481,178 A | 1/1996 | Wilcox | |
| 5,488,322 A * | 1/1996 | Kaplinsky | 327/74 |
| 5,629,947 A * | 5/1997 | Kellum et al. | 714/745 |
| 5,661,442 A | 8/1997 | Sparks | |
| 5,965,961 A | 10/1999 | Lampe | |
| 6,061,396 A | 5/2000 | Everitt | |
| 6,255,902 B1 | 7/2001 | Gilliland | |
| 6,259,317 B1 | 7/2001 | Melanson | |
| 6,366,137 B1 * | 4/2002 | Garnier | 327/64 |
| 6,430,717 B1 | 8/2002 | Noji | |
| 6,538,779 B1 * | 3/2003 | Takeshita et al. | 398/27 |

(Continued)

OTHER PUBLICATIONS

Tobias Ellermeyer, Ulrich Langmann, Berthold Wedding, and Wolfgang Pöhlmann, "A 10-Gb/s Eye-Opening Monitor IC for Decision-Guided Adaptation of the Frequency Response of an Optical Receiver", Dec. 2000, IEEE.*

*Primary Examiner*—Chieh M Fan
*Assistant Examiner*—Aristocratis Fotakis
(74) *Attorney, Agent, or Firm*—Mark E. McBurney; Schubert Osterrieder & Nickelson PLLC

(57) ABSTRACT

Embodiments include a time-sharing detector that is designed to enable comparison of a first reference voltage and a second reference voltage against the serial data transmission in a specified pattern. In many embodiments, the pattern is predefined and, in some embodiments, the pattern includes an overlap period. During the overlap period both the first and the second reference voltages are compared with the data transmission to determine if valid data can be detected. Upon detecting a valid bit based upon one of the reference voltages, an output signal is generated to indicate that the data transmission includes a valid data signal. Advantageously, alternating between the comparisons can reduce power consumption. In many embodiments, the power reduction can be, for example, 50%, depending upon the specified pattern.

10 Claims, 4 Drawing Sheets

U.S. PATENT DOCUMENTS

| | | |
|---|---|---|
| 6,693,458 B1 * | 2/2004 | Barrow ........................ 326/82 |
| 6,717,445 B1 | 4/2004 | Nair |
| 6,784,653 B2 * | 8/2004 | Baumert .................. 324/76.28 |
| 6,873,193 B2 | 3/2005 | Kinoshita |
| 7,215,158 B2 | 5/2007 | Kitagawa |
| 7,406,135 B2 * | 7/2008 | Cranford et al. ............ 375/316 |
| 2002/0060820 A1 * | 5/2002 | Buchali ....................... 359/109 |

* cited by examiner

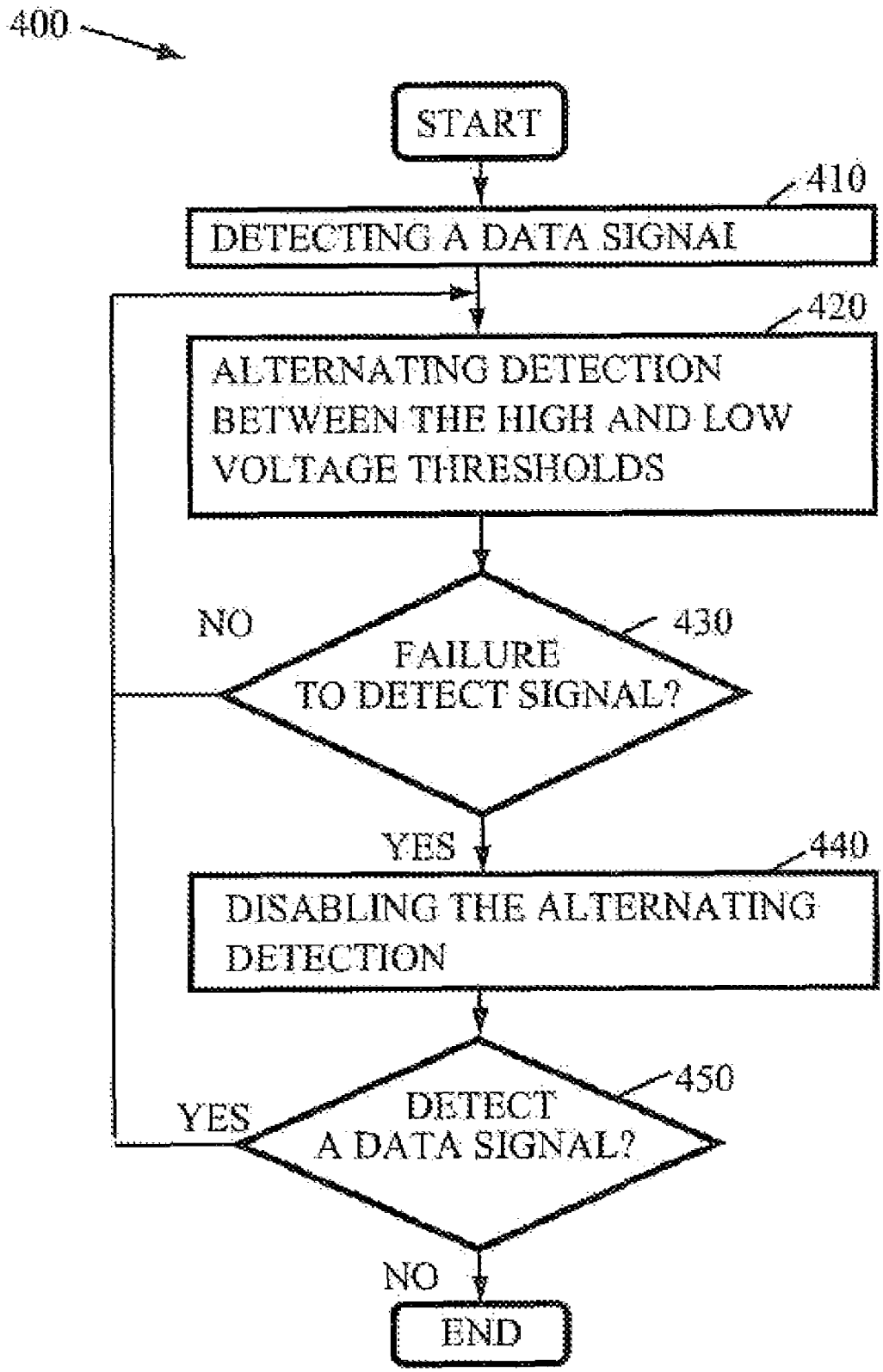

REDUCING POWER CONSUMPTION IN SIGNAL DETECTION

CROSS-REFERENCES TO RELATED APPLICATIONS

This application is a continuation application that claims benefit of the earlier filing date of U.S. patent application Ser. No. 10/873,672, entitled "REDUCING POWER CONSUMPTION IN SIGNAL DETECTION", filed on Jun. 22, 2004 now U.S. Pat. No. 7,406,135.

FIELD

The present invention is in the field of digital communications. More particularly, the present invention relates to methods, systems, and media for time-sharing the signal detection between voltage thresholds for a data transmission to reduce power consumption in, e.g., high-speed, serial data transmissions.

BACKGROUND

Communication systems typically include logic and hardware to transmit data from an originating device to a target device. In particular, communication systems have routing or switching logic to make high-level decisions that select ports, routes, and media for transmitting the data. Communication systems also include links, each having a transmitter, a medium, and a receiver, to transmit the data in response to those high-level decisions. Data is clocked by the transmitter and transmitted to a receiver, e.g., from a router to a hub, computer to computer, or one processor card to another processor card.

Even when transmitting data across a transmission medium without the corresponding clock signals, noise introduced during the data transmission, such as transmitter jitter, channel jitter and data dependent jitter, reduces the sampling window for data. For example, transmitter jitter can result from many sources such as feed through, random jitter, systematic offsets, duty cycle distortion, and power supply noise. Duty cycle distortion, for instance, is caused by non-symmetric positive and negative duty cycles of a data symbol and can show up either as a high frequency correlated jitter or as a phase step. Further, channel jitter can result from phase dispersion, such as inter-symbol interference (ISI). When a long stream of ones, for example a sinusoid of 800 MegaHertz (MHz) and 2.4 GigaHertz (GHz), transitions into a long stream of zeros, for example a sinusoid of 1.6 GHz, differences in the propagation delay between 800 MHz, 1.6 GHz, and 2.4 GHz of the transmission medium can cause phase shifts at each transition point. The phase shifts, phase steps, and reduced duty cycles reduce the perceivable data-sampling window for the receiver.

Parallel transmission of data involves not only these problems but also problems associated with, e.g., noise coupling between channels and varying amounts of delay across the parallel channels for each string of bits. And, as the physical distances and frequencies of the data transmission increase, these problems are accentuated to the point that parallel data transmission is infeasible when considering high-speed, serial data transmissions as alternatives. High-speed, serial data transmissions avoid issues related to the noise coupling between channels and varying amounts of delay across the parallel channels because one bit is sent at a time across the serial data link.

Serializer-Deserializer (SerDes) facilitates high-speed, serial data transmissions in communications systems, converting data received via a parallel bus into a serial format to be transmitted to a target device via a high-speed, serial data transmission. A SerDes chip at the originating device clocks the data originally and converts data from a parallel format to a serial format. Then, a SerDes chip at each intermediate destination typically clocks the data and re-transmits the data to the next destination until the data reaches the target device.

The transmitters and receivers of the links consume varying amounts of power depending upon characteristics of the data transmission and the medium through which the data transmission is routed. For instance, serial links within a large interconnect system such as a super computer may consume 20 to 37% of total power consumption. More specifically, data transmissions at higher data frequencies, with difficult data traffic types or patterns, via long media, and/or via lossy media, require amplifiers and complex, mixed-signal circuitry. The amplifiers and complex, mixed-signal circuitry improve or maximize the sampling window for bits of data in the data transmission to maintain an acceptable bit error rate (BER), i.e., the number of misinterpreted bit values for the data transmission.

One continuous source of power consumption for high-speed, serial data links at the physical layer is the signal-detect function typically incorporated in to the receiver of the SerDes. Receivers are designed to verify that a valid data signal is being received by monitoring incoming data transmissions for logical ones and zeroes. Data signals include, for example, positive voltages for logical ones and negative voltages for logical zeroes, or vice versa. In such circumstances, the receivers verify receipt of a valid data signal by verifying that logical ones and zeros are being received. Receipt of logical ones and zeroes is verified by comparing the data transmission to both a positive reference voltage and a negative reference voltage. If the data transmission includes voltages above the positive reference voltage or below the negative reference voltage during a period of time in which valid data is expected, the receiver confirms receipt of the valid data signal. However, power is continually consumed by a detector for the positive reference voltage and the detector for the negative reference voltage regardless of which detector actually detects bits in the data transmission.

Current attempts to reduce power consumption for the signal-detect function significantly reduce the receivers' ability to accurately detect signal loss at the physical layer. These systems compare data transmissions with a single reference voltage, i.e., either a reference for a logical one or a reference for a logical zero, ignoring the second reference voltage. However, one of the anticipated symptoms for problems associated with high-speed, serial data links, is the inability to produce both types of bits. For example, the link may correctly transmit logical ones while failing to transmit logical zeroes. Such solutions leave detection of problems related to one type of bit to higher layer logic. A further example is that the medium over which the data transmission is communicated, such as a wire for electrical signals, may be, e.g., shorted to the positive or negative rail.

Therefore, there is a need for a scheme to reduce power consumption for the signal-detect function of receivers without significantly reducing the receivers' ability to accurately detect signal loss at the physical layer.

SUMMARY

The problems identified above are in large part addressed by methods, systems, and media for time-sharing the signal detection between reference voltages for a data transmission. One embodiment provides, a method for time-sharing the signal detection between reference voltages for a data transmission. The method generally includes comparing a first reference voltage with a data transmission to detect a first type of bit during a first data period of the data transmission and comparing a second reference voltage with the data transmission to detect a second type of bit during a second data period of the data transmission. Comparison of the first voltage with the data transmission during the second data period is disabled and comparison of the second reference voltage with the data transmission during the first data period is disabled.

Another embodiment provides an apparatus for time-sharing signal detection between reference voltages for a data transmission. The apparatus contemplates a first threshold detector to compare a first reference voltage with the data transmission to detect a first type of bit during a first data period of the data transmission and a second threshold detector to compare a second reference voltage with the data transmission to detect a second type of bit during a second data period of the data transmission. Embodiments further comprise a controller coupled with the first threshold detector to disable comparison of the first voltage with the data transmission during the second data period and coupled with the second threshold detector to disable comparison of the second reference voltage with the data transmission during the first data period.

Yet another embodiment provides a receiver. The receiver generally includes circuitry to interpret more than one type of bits in a data transmission; and a signal detector coupled with the circuitry to compare the data transmission to a first reference voltage and a second reference voltage in alternate data periods to detect the more than one type of bits, to generate a signal indicative of a loss of the data transmission in response to an inability to detect at least one of the types of bits.

BRIEF DESCRIPTION OF THE DRAWINGS

FIG. 4 depicts an example of a flow chart to time-share the signal detection between reference voltages for a data transmission received by an apparatus such as the time-shared signal detector described in FIG. 1.

DETAILED DESCRIPTION OF EMBODIMENTS

Figure 1:
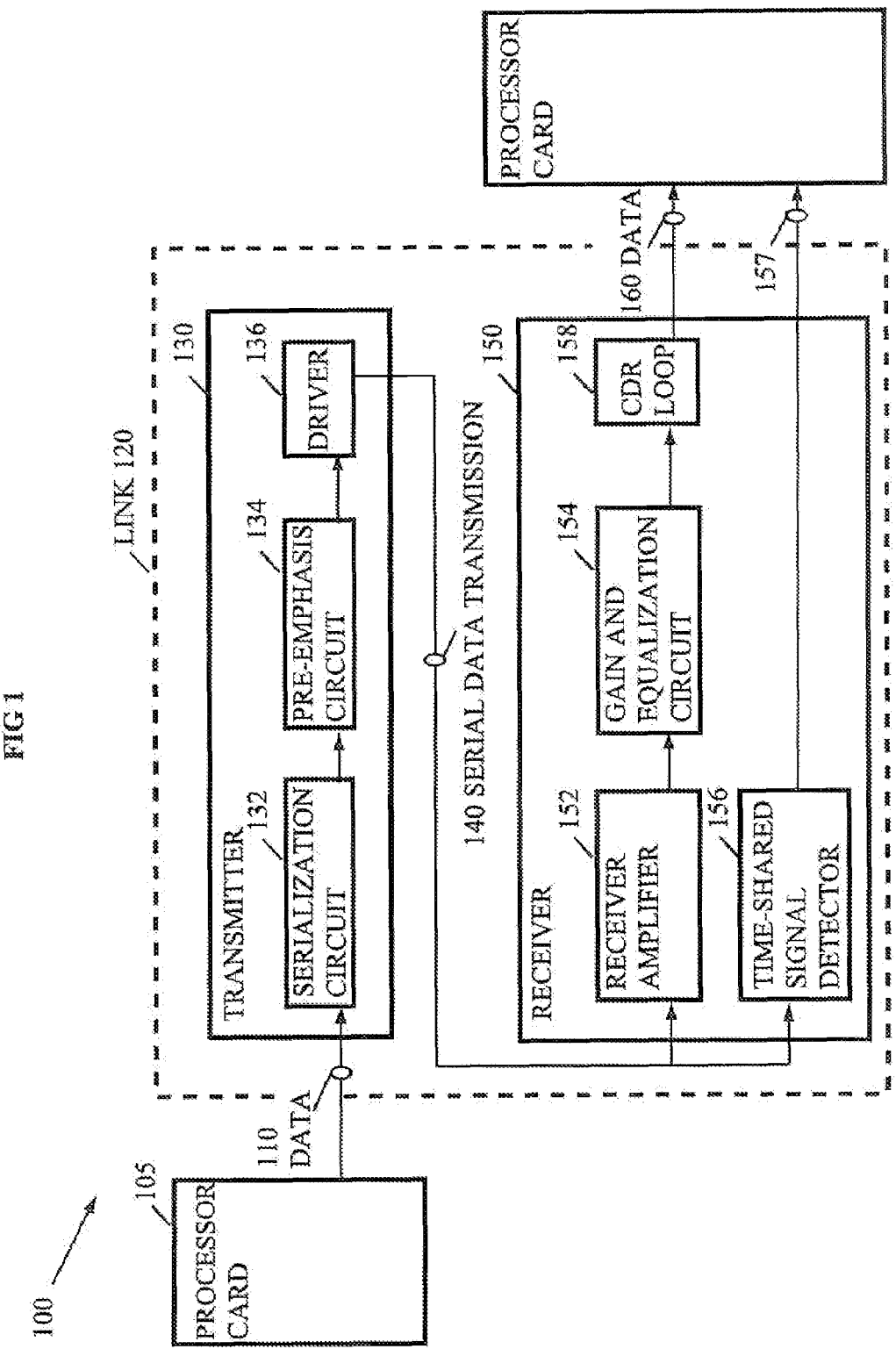
FIG. 1 depicts an embodiment of a system including processor cards communicatively coupled via a link.

The following is a detailed description of example embodiments of the invention depicted in the accompanying drawings. The example embodiments are in such detail as to clearly communicate the invention. However, the amount of detail offered is not intended to limit the anticipated variations of embodiments, but on the contrary, the intention is to cover all modifications, equivalents, and alternatives, falling within the spirit and scope of the present invention as defined by the appended claims. The detailed descriptions below are designed to make such embodiments obvious to a person of ordinary skill in the art.

Generally speaking, methods, systems, and media to time-share the signal detection between reference voltages for a data transmission are disclosed. Embodiments include a time-sharing detector that is designed to enable comparison of a first reference voltage and a second reference voltage against the serial data transmission in a specified pattern. In many embodiments, the pattern is pre-defined and, in some embodiments, the pattern includes an overlap period. During the overlap period both the first and the second reference voltages are compared with the data transmission to determine if valid data can be detected. Upon detecting a valid bit based upon one of the reference voltages, an output signal is generated to indicate that the data transmission includes a valid data signal. Advantageously, alternating between the comparisons can reduce power consumption. In many embodiments, the power reduction can be, for example, 50%, depending upon the specified pattern. Further, the pattern can include a period during which the data is not compared against either reference voltage. This allows for a tradeoff between greater power savings and the response time of the signal detect.

In addition, the power reduction is realized with very little or no degradation in signal detection. The purpose of signal detection is to determine, if possible, at a physical layer device, whether data is being received. Signal detection provides the ability to quickly determine that no data is being received and communicate that problem to higher level logic such as link layer logic and transport layer logic. Further, the problems that signal detection typically identifies generally occur prior to initiating a serial data transmission and are much less likely to occur in the middle of a data transmission. For instance, a driver card may not be plugged in correctly. Thus, many embodiments begin with detection of both logical ones and logical zeros being transmitted in the serial data transmission. Once a logical one or zero is detected, an alternating, or time-time shared, pattern for signal detection is implemented, taking advantage of the lower probability that a problem will occur after valid data transmission is confirmed.

While specific embodiments will be described below with reference to particular circuit configurations such as direct current (DC) signals, positive and negative differential threshold detectors, reference voltages, and further implementation-level circuit representations, those of skill in the art will realize that embodiments of the present invention may advantageously be implemented with any other circuit configurations that implement serial data transmissions and facilitate time-sharing of reference voltage comparisons.

Turning now to the drawings, FIG. 1 depicts an embodiment of a system 100 including a link 120 for high-speed, serial transmission of data 110 from a processor card 105 to a processor card 170. Processor cards 105 and 170 may include cards within the same physical chassis or rack, or may represent parts physically separated such as parts of a super computer in two different physical locations. In some embodiments, link 120 provides high-speed, serial transmission for data 110 between processor cards 105 and 170 because a parallel data path is unavailable due to, e.g., the distance between processor cards 105 and 170, In other embodiments, any number of serial and/or parallel links may be in the data path between processor cards 105 and 170. Certain details such as data buffers are also not shown explicitly for simplicity.

Link 120 may represent, e.g., a serializer-deserializer (SerDes) designed to serialize data 110 received via a parallel bus of processor card 105. Data 110 may then be serialized and transmitted via a serial data transmission 140 to receiver 150. Upon reaching receiver 150, receiver 150 deserializes data 110 to generate another parallel data signal 160 for processor card 170. In some embodiments, transmitter 130 is part of a SerDes chip also having a receiver at one location and receiver 150 is part of a second SerDes chip that also includes a transmitter. In other embodiments, transmitter 130 and receiver 150 are a matched pair of the SerDes provided as separate transmitter and receiver chips. For example, link 120 may include a matched transmitter 130 and receiver 150 such as ah optical transmitter and an optical receiver for transmitting serial data transmission 140 via an optical medium.

Transmitter 130 is responsive, to receipt of data 110, preparing and transmitting data 110 via serial data transmission 140 to receiver 150. Transmitter 130 may include a serialization circuit 132, a pre-emphasis circuit, and a driver 136. Serialization circuit 132 serializes data 110, clocking the data at, e.g., six Gbps, and, in many embodiments, pre-amplifies the serialized data based upon input specifications for pre-emphasis circuit 134. In several embodiments, for instance, serialization circuit 132 includes a low frequency clock source having low jitter (to maximize the sampling window for the data) and a multiple phase output. The rising and/or falling edges of the multiple phases are utilized to clock parallel inputs of data 110 into a single, six Gbps data stream.

Figure 2:
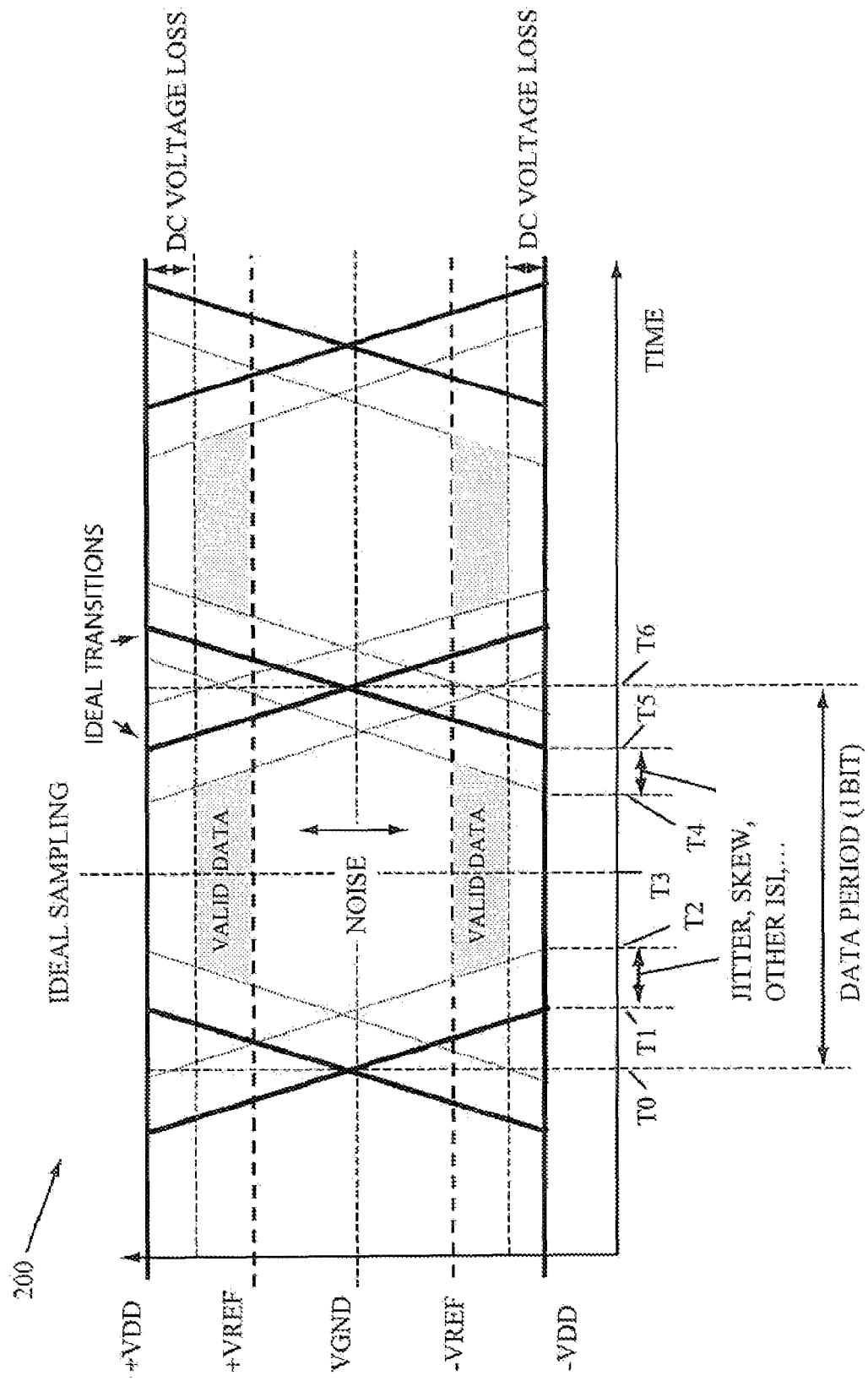
FIG. 2 depicts an embodiment of an eye diagram for data signals such as the serial data transmission of FIG 1.

To illustrate the need for amplifying data signals or portions thereof, such as the serial data transmission 140 of FIG. 1, FIG. 2 depicts an embodiment of an eye diagram for data signals. In digital communications the eye diagram is used to visualize how the waveforms used to send multiple bits of data can potentially lead to errors in the interpretation of those bits inter-symbol interference (ISI), direct current (DC) offsets from, e.g., resistances in the transmission media for the serial data transmission 140, and the like.

The eye diagram shows overlapping data periods, or periods in which one valid bit is or should be available for detection. A data period is illustrated between times T0 and T6. In the present embodiment, a bit is either a positive voltage or a negative voltage. In an ideal situation, the bit would either be +VDD or –VDD for the entire bit period between data transitions at times T1 and T5. As illustrated, however, jitter, skew, and/or other ISI reduce the time period in which valid data is available by causing data transitions to complete data transitions late, T2, and begin early, T4. Further, DC voltage loss reduces the amplitude of the voltage of the valid data from the positive and negative rails, +VDD and –VDD, while noise near, e.g., VGND requires +VREF and –VREF be used to distinguish valid bits from noise.

As a result of the degradation of the valid bit window, the ideal sampling position for determining bits of the data signal is the center of the data period, T3. The ideal sampling position is approximated and tracked by a clock and data recovery (CDR) loop like CDR loop 158.

Referring again to FIG. 1, pre-emphasis, circuit 134 and driver 136 may increase the gain for one or more clock frequencies associated with the serialized data signal generated from data 110. The increased gain is designed to increase the voltage of data over noise. For instance, pre-emphasis circuit 134 may utilize a finite impulse response (FIR) equalizing filter to cancel or at least reduce frequency-dependent attenuation such as attenuation caused by the skin-effect resistance of copper wire when copper wire is the medium through which serial data transmission 140 is transmitted. Pre-emphasis circuit 134 accentuates the high frequency components of the data signal to at least partially alleviate the effects of ISI.

Then, driver 136 drives serial data transmission 140 across a medium such as a copper wire or an optical fiber. In some embodiments, for example, driver 136 may include a Fibre Channel driver and serial data transmission 140 may transmit through a channel of a fiber optic cable. In further embodiments, driver 136 also include an amplifier for providing gain to the serial data transmission, especially when the distance between transmitter 130 and receiver 150 is large.

Receiver 150 is designed to compensate for the smaller sampling window by attempting to align a data sampling clock signal, or recovered clock signal, with the center of the data-sampling window, i.e., the ideal sampling position described in FIG. 2. Receiver 150 includes a receiver amplifier 152, a gain and equalization circuit 154, time-shared signal detector 356, and clock and data recovery (CDR) loop 158.

Receiver 150 receives serial data transmission 140 from driver 136 in parallel with receipt of serial data transmission by time-shared signal detector 156. Receiver 150 pre-amplifies serial data transmission 140 for gain and equalization circuit 154. Gain and equalization circuit 154 amplifies data transmission 140 and accentuates the high frequency components to attempt to increase the sampling window for the data. Then, CDR loop 158 samples the data while maintaining a phase relationship between a sampling clock and serial data transmission 140. In other embodiments, time-shared signal detector 156 may receive serial data transmission 140 after gain and equalization.

CDR loop 158 samples the data from data transmission 140, compares the phase of the sampling clock to the phase of the data transmission 140 and adjusts the sampling clock accordingly. In particular, a clock generator such as a voltage-controlled oscillator (VCO) with a phase-locked loop (PLL) follows the phase of the data signal to align data samples with the center of a sampling window. When second order and third order frequency tracking circuits are included in CDR loop 158, second and third order corrections can be made to adjustments of the sampling clock phase. For example, initial samples from data transmission 140 indicate instantaneous, high frequency changes to the phase of data transmission 140. Second order and third order frequency tracking circuits observe and correct for lower frequency changes in the phase of data transmission 140. Once CDR loop 158 samples the data transmission 140, the determined values of the bits are output as data 160 to processor card 170.

Time-shared signal detector 156 compares serial data transmission 140 to positive and/or negative reference voltages to determine whether data transmission 140 includes a valid data signal. In response to a valid data signal and/or a lack thereof, time-shared signal detector 156 outputs a signal 157 to processor card 170. For example, time-shared signal detector 156 may receive data transmission 140 and compare data transmission 140 to a positive reference voltage for a predetermined number of data periods. Then, time-shared signal detector 156 may start comparing data transmission 140 to a negative reference voltage instead of the positive reference voltage for a predetermined number of data periods. Advantageously, alternating between detection of positive and negative reference voltages in a specified pattern may reduce power consumption with little or no significant impact on the ability to determine whether data transmission 140 includes a valid data signal.

In some embodiments, time-shared signal detector 156 may initially enable detection of both logical ones and zeros simultaneously by comparing data transmission 140 to both the positive and negative reference voltages. Once a valid data signal is confirmed and/or after a selected period of time, time-shared signal detector 156 may begin comparing data transmission 140 to the positive and negative reference voltages in alternate data periods. In further embodiments, time-shared signal detector 156 may alternate between comparing data transmission 140 to the positive reference voltage, the negative reference voltage, and both the reference voltages in a selected pattern. Advantageously, time-shared signal detector 156 may reduce power consumption by alternatively monitoring data transmission 140 for logical ones and logical zeros.

Figure 3:
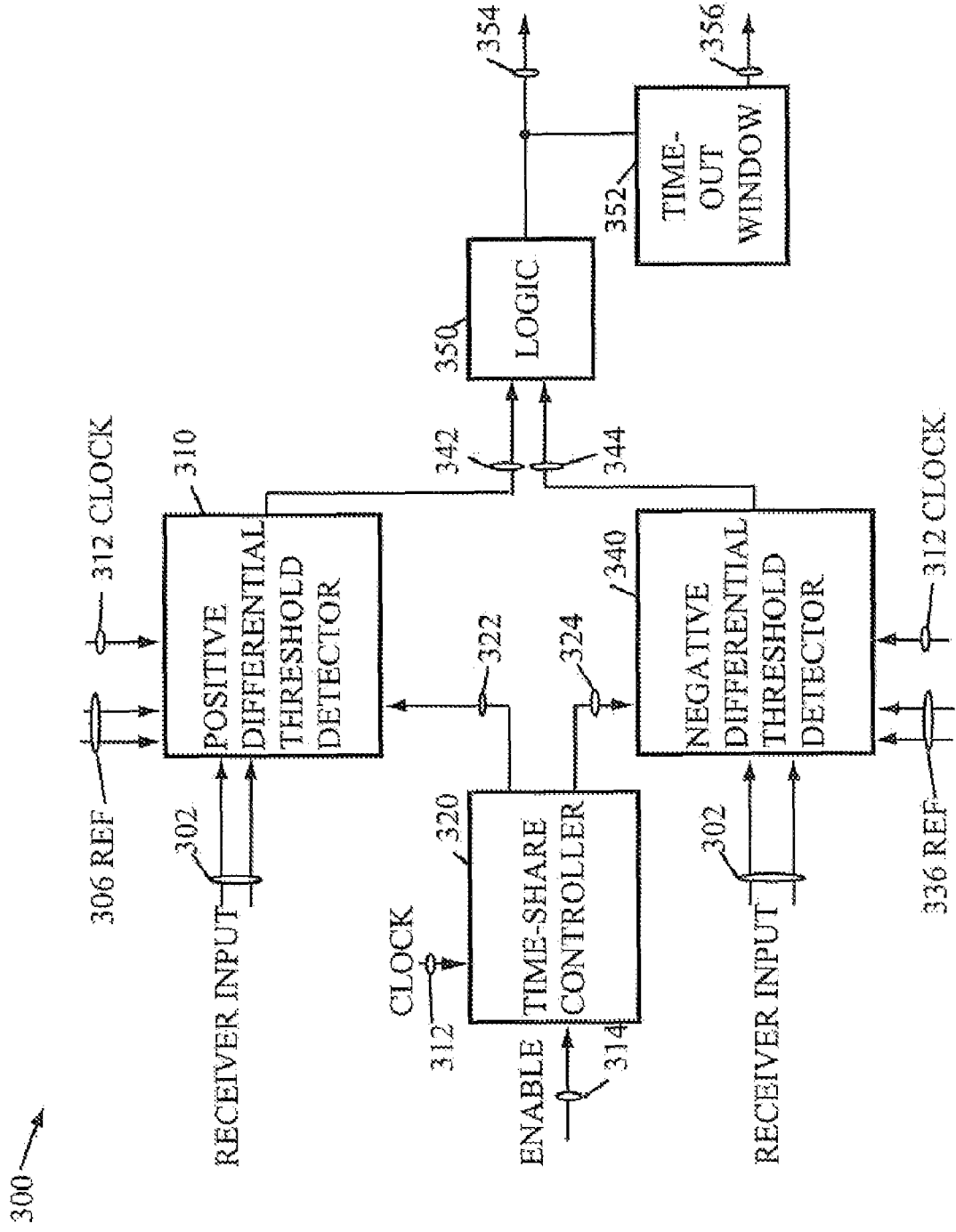
FIG. 3 depicts an embodiment of an apparatus such as the time-shared signal detector in FIG 1.

FIG. 3 depicts an embodiment of an apparatus 300 such as the time-shared signal detector 156 in FIG. 1. Apparatus 300 is designed to alternate between detection of bits associated with positive voltages and bits associated with negative voltages of a DC serial data transmission similar to the serial data transmission 140 of FIG. 1. More specifically, a time-share controller 320, once enabled, alternately disables a positive differential threshold detector 310 and a negative differential threshold detector 340, advantageously reducing power consumption.

Apparatus 300 includes positive differential threshold detector 310, time-share controller 320, negative differential threshold detector 340, a logic 350, and a time-out window 352. Positive differential threshold detector 310 may compare an incoming data signal, receiver input 302, to a reference input 306. And, in some embodiments, positive differential threshold detector 310 compares receiver input 302 to reference input 306 only at a transition of a clock 312 to conserve power. Reference input 306 may represents a reference, voltage such as +VREF from FIG. 2. If receiver input 302 reaches a voltage greater than or equal to reference input 306 then positive differential threshold detector 310 will output an indication, such as a signal representing a logical true, that the bit has been detected. Further, positive differential threshold detector 310 may be disabled by disable signal 322 from time-share controller 320. While positive differential threshold detector 310 is disabled in the present embodiment, the output signal 342 is maintained at a logical one so that logic 350 may still monitor output signal 344.

Similarly, negative differential threshold detector 340 may compare receiver input 302 to a reference input 336 and, in further embodiments, negative differential threshold detector 340 compares receiver input 302 to reference input 336 only at a transition of a clock 312 to conserve power. Reference input 336 represents a reference voltage such as −VREF from FIG. 2. If receiver input 302 reaches a voltage having a negative magnitude equivalent to or greater than reference input 336 then negative differential threshold detector 340 outputs an indication that the bit has been detected. Negative differential threshold detector 310 may also be disabled via disable signal 324 from time-share controller 320. While negative differential threshold detector 340 is disabled in the present embodiment, the output signal 344 is maintained at a logical one so that logic 350 may still monitor output signal 342.

Time-share controller 320 may be designed for the reducing power consumption of apparatus 300 by generating disable signals 322 and 324 for disabling positive differential threshold detector 310 and negative differential threshold detector 340. Although depicted as a single element, time-share controller 320 may include one or more circuits or modules, located in adjacent or separate locations, e.g., on a chip. In some embodiments, time-share controller 320 is enabled by enable signal 314 after detecting a valid data signal from receiver input 302. Thereafter, time-share controller 320 is adapted to alternate between disabling positive differential threshold detector 310 and negative differential threshold detector 340 in some pattern. In many embodiments, time-share controller 320 provides a short period of overlap, wherein both positive differential threshold detector 310 and negative differential threshold detector 340 are enabled. The overlap prevents a failure to detect a positive or negative bit from receiver input 302 during the transition between the positive and negative differential threshold detectors 310 and 340. For example, when a data signal first arrives as receiver inputs 302, both the positive and negative differential threshold detectors 310 and 340 are enabled.

When a one of the detectors 310 and 340 determines that the voltage of receiver input 302 exceeds the magnitude of a reference input 306 or 336, a signal 342 or 344 representing a logical true is output to logic 350.

In response to detection of a valid bit in receiver input 302, enable signal 314 is turned on. Enable signal 314 initiates a pattern of disable signals 322 and 324. In one embodiment, the pattern involves turning on a disable signal 322 or 324 for 256 data periods, turning that disable signal off for 64 data periods, and then turning the alternate disable signal on for 256 data periods. For instance, after positive differential threshold detectors 310 detects a voltage above a reference voltage represented by reference input 306, enable signal 314 is turned on, enabling time-share controller 320. Time-share controller 320 then turns disable signal 322 on for 256 data periods based upon clock 312. During those 256 data periods, negative differential threshold detector 340 monitors receiver input 302 to determine whether a bit is detected during a valid data window. After the 256 data periods, the disable signal 322 is turned off, enabling positive differential threshold detector 310. Both the positive and negative differential threshold detectors 310 and 340 continue to monitor receiver inputs 302 for 64 data periods. At the end of the 64 data periods, time-share controller 320 generates a disable signal 324 and leaves the disable signal 324 on for 256 data periods. After the 256 data periods, the positive and negative differential threshold detectors 310 and 340 are left on for 64 data periods. The pattern then continues to repeat while enable signal 314 is turned on. On the other hand, when enable signal 314 is turned off, both the positive and negative differential threshold detectors 310 and 340 continue to monitor receiver inputs 302.

In other embodiments, time-share controller 320 may output enable signals rather than disable signals. The enable signals remain on, enabling positive and negative differential threshold detectors 310 and 340 until enable signal 314 is turned on. Once enable signal 314 is turned on, time-share controller 320 begins alternating enable signals for the positive and negative differential threshold detectors 310 and 340 in a pre-determined pattern.

In further embodiments, other voltage levels may be implemented as references and detected in receiver inputs 302. In some of such embodiments, both of the voltages detected in receiver inputs 302 may be positive. In other embodiments, both of the voltages are negative.

Logic 350 receives indications from positive differential threshold detector 310 when a bit represented by a positive voltage is detected and an indication from negative differential threshold detector 340 when a bit represented by a negative voltage is detected. If a bit indication is received from either of the detectors, logic 350 outputs a signal 354 to indicate that a bit is being or has been detected, i.e., a valid data signal is detected. For example, output signals 342 and 344 may remain at a logical zero until a bit is detected. Upon detecting a bit, depending upon whether the positive or negative differential threshold detector 310 or 340 detected the signal, either 342 or 344, respectively, will become a logical one. In response to a logical one on either output signals 342 or 344 while one is disabled, logic 350 outputs signal 354 as a logical one to indicate a valid data signal is detected. When both output signals are enabled, on the other hand, logic 350 outputs signal 354 as a logical one if both output signals 342 and 344 are logical ones.

In further embodiments, logic 350 may be configured differently depending upon the signals available from positive differential threshold detector 310 and negative differential threshold detector 340. In some embodiments, for instance, logic 350 may function as art OR gate or an AND gate depending upon the state of the enable signal 314. In other embodiments, logic 350 may include more than one separate logic modules such as an OR gate and an AND gate, each receiving signals 342 and 344. In other embodiments, NAND and/or NOR gates may be implemented as logic 350, or part thereof.

Time-out window 352 monitors output signal 354 and produces a time-out signal 356 to indicate that no signal has been detected for a pre-determined time period. For instance, the time-out time period may be based upon a resistance-capacitance (RC) circuit discharge time, a number of clock cycles, a number of data periods, or any other substantially consistent time reference. In many embodiments, time-out window 356 is reset each time Logic 350 outputs an indication that a valid data signal is detected from receiver input 302. In several embodiments, when a valid data signal is not detected for the time-period monitored by time-out window 352, the enable signal 314 is turned off, allowing both the positive and negative differential threshold detectors 310 and 340 to monitor receiver inputs 302 for a valid data signal.

Referring now to FIG. 4, there is shown an example of a flow chart to time-share the signal detection between reference voltages for a data transmission received by an apparatus such as the time-shared signal detector 156 described in FIG. 1. Flow chart 400 begins with detecting a data signal (element 410) such as from serial data transmission 140 of FIG. 1. In many embodiments, the apparatus monitors for both logical ones and logical zeros by comparing the data transmission with a high threshold voltage and a low threshold voltage.

Upon detecting a valid bit in the data transmission, the apparatus begins to compare the data transmission to the high threshold voltage and the low threshold voltage in alternating data periods (element 420) based upon a specified pattern. In some of these embodiments, during a transition time period, the apparatus compares the data signal to both the high threshold voltage and the low threshold voltage. For example, the apparatus may implement a pattern of comparisons of 300 clock cycles with one reference voltage comparison disabled and 100 cycles with comparisons against both voltage thresholds enabled.

When the apparatus continues to detect a valid data signal (element 430), the apparatus continues to alternate detection between the high and low voltage thresholds (element 420). On the other hand, if the apparatus fails to detect any bits in the data transmission for a pre-defined period of time such as 100 cycles (element 430), the alternating detection scheme is disabled (element 440) implementing comparisons of the data transmission against both the high and low voltage thresholds (element 440). Failure to detect data in the data transmission for a period of time may be indicative of a problem such as a hardware problem. For example, a driver card may be plugged, in incorrectly, the communication medium between the transmitter and receiver may be plugged in incorrectly, a component of the transmitter or receiver may be inoperative as a result of an over-voltage, or some other problem preventing transmission of data from the transmitter to the receiver via the serial data transmission.

It will be apparent to those skilled in the art having the benefit of this disclosure that the present invention contemplates methods, systems, and media to time-share the signal detection between reference voltages for a data transmission. It is understood that the form of the invention shown and described in the detailed description and the drawings are to be taken merely as examples. It is intended that the following claims be interpreted broadly to embrace all the variations of the example embodiments disclosed.

What is claimed is:

1. An apparatus for time-sharing signal detection between reference voltages for a data transmission, the apparatus comprising:

a first threshold detector to compare a first reference voltage with the data transmission to detect a first type of bit during a first data period and a third data period of the data transmission;

a second threshold detector to compare a second reference voltage with the data transmission to detect a second type of bit during a second data period and the third data period of the data transmission; and a controller coupled with the first threshold detector to disable comparison of the first reference voltage with the data transmission during the second data period and coupled with the second threshold detector to disable comparison of the second reference voltage with the data transmission during the first data period, wherein the controller is adapted to alternate the data periods in a specified pattern while the controller is enabled.

2. The apparatus of claim 1, further comprising logic coupled with the threshold detectors to generate an output indicative of detection of one of the types of bits.

3. The apparatus of claim 1, further comprising a time-out window module to generate an output in response to expiration of a time period prior to detection of one of the types of bits.

4. The apparatus of claim 3, wherein the time-out window module is coupled with the first threshold detector and the second threshold detector to reset the time period in response to detection of one of the types of bits.

5. The apparatus of claim 1, wherein the threshold detectors are adapted to determine whether a voltage magnitude of the data transmission is at least as large as a magnitude of one of the reference voltages.

6. The apparatus of claim 1, wherein the controller is adapted to disable the comparisons during a fourth data period of the data periods.

7. A receiver, comprising:

circuitry to interpret more than one type of bits in a data transmission; and a signal detector coupled with the circuitry to compare the data transmission to a first reference voltage during a first-reference data period and a second reference voltage during a second-reference data period, and to compare the first reference voltage and the second reference voltage to the data transmission during a multiple-reference data period, to detect the more than one type of bits, to generate a signal indicative of a loss of the data transmission in response to an inability to detect at least one of the types of bits, the signal detector to alternate the first-reference data period, the second-reference data period, and the multiple-reference data period in a pattern.

8. The receiver of claim 7, wherein the signal detector comprises logic to generate an output indicative of detection of one of the types of bits.

9. The receiver of claim 7, wherein the signal detector comprises a time-out window module to generate an output in response to expiration of a time period prior to detection of one of the types of bits.

10. The receiver of claim 9, wherein the time-out window module is adapted to reset the time period in response to detection of one of the types of bits.

* * * * *